(No Model.)
T. B. BLOSSER & J. P. KUNKLE.
VEHICLE WHEEL.
No. 529,474. Patented Nov. 20, 1894.
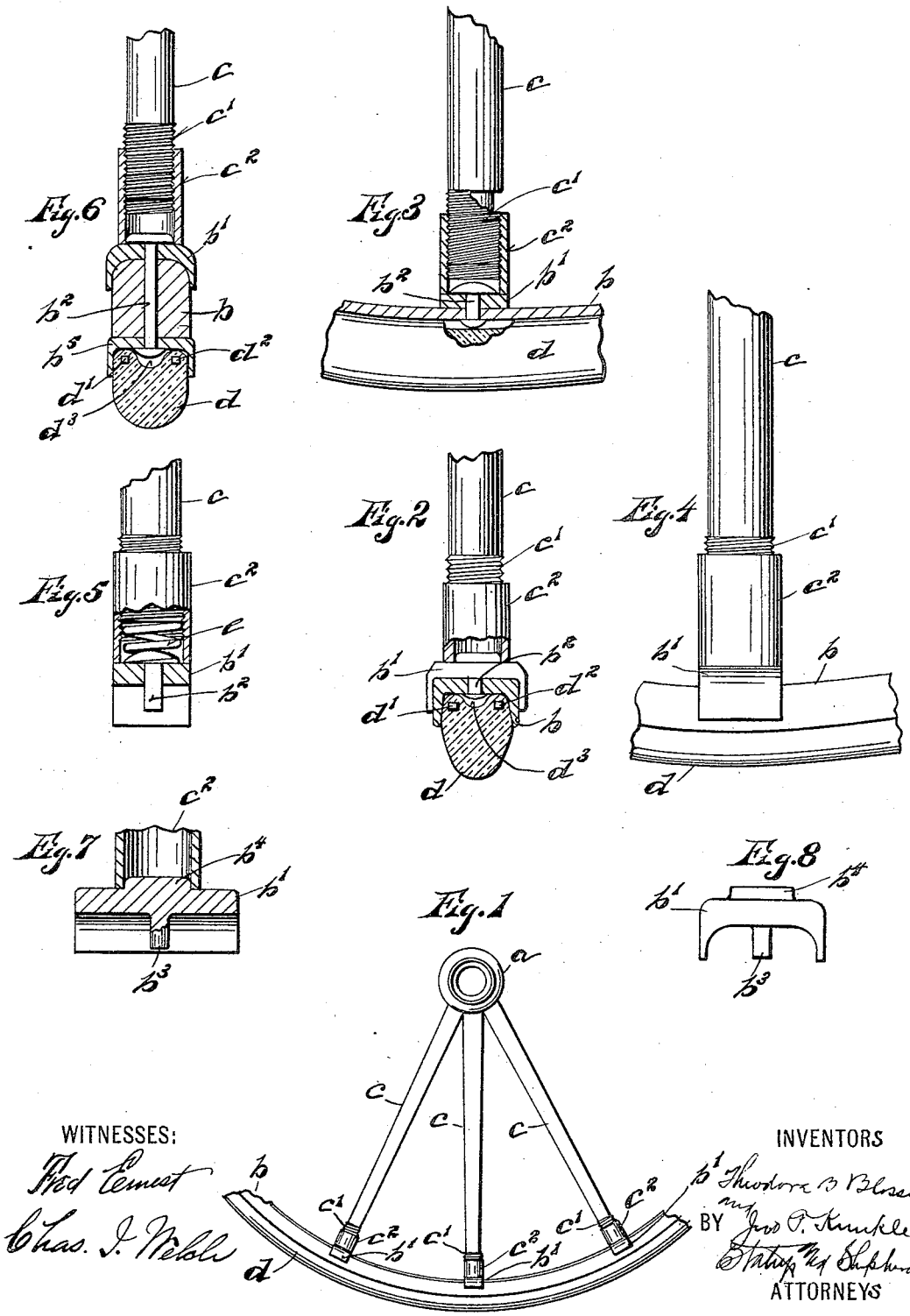

UNITED STATES PATENT OFFICE.

THEODORE B. BLOSSER AND JOHN P. KUNKLE, OF SPRINGFIELD, OHIO, ASSIGNORS OF ONE-HALF TO ALPHONZO FERRELL, OF SAME PLACE.

VEHICLE-WHEEL.

SPECIFICATION forming part of Letters Patent No. 529,474, dated November 20, 1894.

Application filed July 23, 1894. Serial No. 518,406. (No model.)

*To all whom it may concern:*

Be it known that we, THEODORE B. BLOSSER and JOHN P. KUNKLE, citizens of the United States, residing at Springfield, in the county of Clark and State of Ohio, have invented certain new and useful Improvements in Vehicle-Wheels, of which the following is a specification.

Our invention relates to an improvement in wheels, and it especially relates to rubber tired wheels.

Our invention consists in the various constructions and combinations of parts hereinafter described and set forth in the claims.

In the accompanying drawings, Figure 1 is a side elevation of a portion of a wheel embodying our invention. Fig. 2 is a transverse section through the felly of the same, showing the method of securing the spoke thereto. Fig. 3 is a longitudinal section and Fig. 4 is a side elevation of the same. Fig. 5 is a side elevation partly in section showing a modification. Fig. 6 is a transverse sectional view showing the device as applied to a wooden felly. Figs. 7 and 8 are detail views showing a modification in one of the parts.

Like parts are represented by similar letters of reference in the several views.

In the said drawings, $a$ represents the hub of an ordinary vehicle wheel, and $b$ the felly, which may be made of metal adapted to receive a rubber tire, or which may be formed of wood having a metal band thereon.

$c$ is a spoke. Each of the spokes $c$ is provided on one end with a screwthreaded ferrule, onto which is adapted to be screwed one end of an internally screwthreaded sleeve $c^2$.

Secured to the felly $b$ is a washer or saddle $b'$, against which one end of the screwthreaded sleeve $c^2$ is adapted to bear; there being one of these washers or saddles for each spoke. The saddle is secured to the felly by a rivet $b^2$, which passes through the saddle and is riveted to the felly $b$; the head of the rivet $b^2$ being adapted to form a projection which fits in the end of the sleeve $c^2$ and holds the said sleeve against lateral movement on the saddle. If desired the saddle may be made of malleable metal and formed with a projection $b^3$ adapted to pass through the felly $b$ and be riveted thereto; the opposite side of the saddle being formed with a boss $b^4$ over which the sleeve is adapted to fit; this modified construction being represented in Figs. 7 and 8.

In Fig. 6 we have shown the felly $b$ of wood; a metallic band $b^5$ of channel iron being placed thereon to secure the rubber tire, which is shown at $d$; the parts in this case being held together by a rivet $b^2$ which extends through the saddle, felly and rim. The rubber tire $d$ is inserted in the groove formed in the felly or metallic rim, as the case may be, and is preferably held therein by two retaining wires $d'$ $d^2$, which extend through the tire and are united together to form endless bands. The tire $d$ is formed in cross-section of a substantial horse shoe shape, with a recess or groove $d^3$ on the inner side so that as the tire is compressed, it is compressed at the center into said groove and thus prevented from being forced over the edges of the metal so as to cut the tire at this point.

In Fig. 5 we have shown a spring $e$ placed within the sleeve $c^2$ so as to bear at one end against the saddle $b'$ and at the other against the end of the spoke $c$, thus placing the same under tension and holding the parts yieldingly so as to lessen the danger of the parts becoming loose and rattling.

It will be seen that a wheel as thus constructed is extremely simple. The rim or felly may be readily placed on the spokes and tightened thereon, and by the arrangement of the screwthreaded sleeve any spoke may be removed at any time and replaced, thus furnishing means for readily repairing the wheel. Means are also provided by which the wheel may be trued up at any time.

Having thus described our invention, we claim—

1. The combination with a metallic felly formed of channel iron as described, a saddle riveted to said felly and having a seat or projection, a spoke having a screwthreaded thimble, and an internally screwthreaded sleeve to fit on said thimble, said sleeve being adapted to fit over said projection on said saddle, substantially as specified.

2. The combination with the hub and felly of a vehicle, of a screwthreaded spoke, a screwthreaded sleeve on said spoke, a seat or saddle on said felly having a projection to fit said sleeve, and a spring within said sleeve adapted to bear against said saddle and spoke, substantially as specified.

In testimony whereof we have hereunto set our hands this 13th day of July, A. D. 1894.

THEODORE B. BLOSSER.
JOHN P. KUNKLE.

Witnesses:
OLIVER H. MILLER,
CHAS. I. WELCH.